United States Patent Office 3,213,035
Patented Oct. 19, 1965

3,213,035
PHOSPHOROUS CONTAINING POLYMERIZATION CATALYST WITH HYDRATED GEL ADDITIVE
Jacque C. Morrell, 8 Oxford St., Chevy Chase, Md.
No Drawing. Filed July 16, 1962, Ser. No. 216,697
9 Claims. (Cl. 252—435)

This application is a continuation-in-part of prior copending application Serial No. 780,272, filed December 15, 1958, now Patent No. 3,044,096, issued July 17, 1962; Serial No. 803,586, filed April 2, 1959, now Patent No. 3,132,109, issued May 5, 1964; Serial No. 799,857, filed March 17, 1959, now Patent No. 3,050,472, issued August 21, 1962; and Serial No. 800,948, filed March 23, 1959, now Patent No. 3,050,473, issued August 21, 1962.

This invention relates to polymerization catalysts and more particularly to improvements in those types of polymerization catalysts which contain as their principal ingredients a phosphoric acid and a natural porous silica material. The latter material is generally referred to as kieselguhr or infusorial earth and sometimes also as diatomaceous earth. In its most specific aspect my invention relates to improvements of the compression strength and hardness, and in general the wearing qualities of such polymerization catalysts which is at present the most important problem in their use.

The catalysts produced from such mixtures of phosphoric acid and porous silica material, after baking and/or drying the same, have proven to be the best available catalysts for the polymerization of normally gaseous olefins to produce liquid hydrocarbon components of high octane motor and aviation fuels. The polymerization process has for a great many years been one of the most useful and important in the economy of petroleum refining for the conversion of otherwise practically waste gases resulting from both thermal and catalytic cracking into valuable components of motor fuels. The catalyst itself is highly active for the purpose, but it has one outstanding weakness, namely, its poor wearing qualities and its tendency to crumble and to dust during handling and use. This results in a relatively short life and frequent turnover of catalyst with the attendant increased costs. Despite the many years that this problem has existed and the many attempts to solve it, no satisfactory solution has been available to the industry and it is a prime object of the present invention to relieve the refining industry of the problem.

The polymerization catalysts described in my Patents Nos. 2,586,582 and 2,713,560 consisting of kaolin and phosphoric acid were an improvement so far as wearing qualities were concerned but the sacrifice in activity was too great to the economically feasible. Various other solutions of the problem are disclosed in copending applications, for example, Serial No. 780,272 to be issued shortly as a patent. Some of these are continuation-in-part of the applications upon which these patents issued; and others are independent thereof. The present application is a continuation-in-part of Serial Number 780,272. The catalyst products of these various applications consist in a very minor amount of an additive combined with a major amount of a natural porous silica material such as kieselguhr and these in turn are combined with a much larger proportion of a phosphoric acid, e.g. the latter may comprise from 75% to 85% and preferably about or in excess of 80% of the mixture to achieve maximum activity. The final product is dried and baked. Thus a balance between wearing qualities and activity is achieved. In carrying out the objects of my invention I incorporate from about 3% to about 15% and a maximum of about 20% (preferably from about 5% to 10%) of dried mixed gels of alumina and silica with about 85% to 97% of natural porous silica material of the class consisting of kieselguhr, infusorial earth and diatomaceous earth, which mixture I may refer to as the mineral mix. The latter may then be incorporated with a phosphoric acid employing about 20% of the mineral mix and the maximum amount of a phosphoric acid, e.g. up to 80% and above, which will give the proper mixture consistency to be extruded and heated without flowing and to achieve a proper balance between catalyst hardness and compression strength on the one hand and activity of the phosphoric acid on the other at a reasonable cost. The final catalyst will thus contain from about 1% (or less) to about 3% of the additive based on the total; with a preferred ratio of the mineral mix to phosphoric acid of about 20% of the former to about 80% or above of the latter. The latter percentages may, however, vary from about 75% to 85% of phosphoric acid (calculated to 100% concentration) (and in a more narrow range of 78% to 82%) with corresponding changes in the mineral mix. The additive on the other hand may vary from ½% to 5% and above (in any event less than about 10%) of the final catalyst either as such or in terms of the reaction products of the additive with the phosphoric acid.

The various components may be mixed in one of several ways, the additive may be added directly to the phosphoric acid; or to the kieselguhr; or to the mixture of phosphoric acid and kieselguhr as a final step. However, it has been found preferable to mix it direct with the kieselguhr and thereafter from the viewpoint of workability of the mixture, that is, the extrusion and subsequent heating of the product, to mix with the phosphoric acid.

The mixture may be cut to proper size after extrusion (or broken into proper sizes after heating) and is then dried or baked at temperatures varying from about 600° F. to 800° F. or higher depending on the phosphoric acid content for about four to six hours or longer. Catalysts with about 78% to 80% phosphoric acid may be heated from about 600° F. to 800° F. and those above 80% from 750° F. to 900° F. and above.

In my present invention I make use as additives of synthetic combinations of hydrated alumina and silica instead of the natural alumino silicates of my previous applications. However, parenthetically it may be stated that I do contemplate the use of other varieties of the natural alumino-silicates, and modifications of the same. Moreover, there may be certain conditions under which the hydrated silicates may be synthesized corresponding to the natural silicates such as the ortho, meta, di, tri, and the like and may be present in the gel alumina-silica mixtures discussed below and they, if present to any appreciable extent, are to be included on a non-equivalent basis in the present additive.

In my present invention I contemplate the use primarily of mixtures of hydrated and/or gel type aluminas— $(Al_2O_3) \cdot xH_2O$ admixed or combined with the hydrated or gel type silicas $SiO_2 \cdot xH_2O$. I may state broadly that these combinations of alumina and silica are generally of the types employed as cracking catalysts as will hereinafter be described. (I may also mention in passing that I may employ combinations of magnesium oxide-silica mixture in gel and/or hydrated forms on a non-equivalent basis.)

Generally the silica-alumina type of hydrosol is prepared and washed and dried and/or activated to produce cracking catalysts which material is useful as the additive to the phosphoric acid-kieselguhr mixtures and catalyst in connection with my present invention by extruding the mixture of phosphoric acid, kieselguhr and the additive sizing and drying the same as hereinafter described to be used as a polymerization catalyst. The synthetic silica-alumina mixture or combination generally may be employed in the same manner and in the same range of proportions i.e. about 3% to 20% and preferably 5% to 10% of the mineral mix (additive plus kieselguhr) or overall somewhat less than 1% to about 4% of the total catalyst mix—including the phosphoric acid added. It is to be understood that the ratio of alumina to silica in the additive may be varied over a wide range i.e. from 5% to 95% and the reverse for each component of the additive. One example method of preparing mixtures of the hydrated gel of alumina and silica is by co-precipitation employing a solution of sodium silicate on the one hand and one of aluminum sulphate on the other hand and thoroughly washing the resulting mixed gels of silica and alumina prior to drying. The proportions may be adjusted as desired. Separate precipitation and mixing of the gels may also be employed, also washing and drying the same.

As one more detailed and preferred example of the preparation of synthetic alumina-silica gel, the following is given.

In general the alumina-silica mix is prepared by mixing diluted sulphuric acid with sodium silicate to form the silica hydrosol. After the latter is set to a gel it is discharged into the processing tank generally by means of high pressure streams of water. The sizes of the material ranges at this stage from ½ inch to about 10 mesh. Processing conditions vary from acidic to basic. The material is then washed to remove sodium sulphate from the hydrogel formation, but gel structure is fixed also by control of temperature and pH. The next step consist of impregnation of the silica hydrogel with an aluminum sulphate solution until the desired alumina level is obtained. The next operation consists of precipitation of alumina gel within the silica gel structure by the use of ammonium hydroxide which is circulated thru the mix to insure complete precipitation. The ammonium sulphate is then removed by washing. The hydrogel (alumina-silica) is then dried and the latter may be re-washed to remove additional ammonium sulphate. Activation is accomplished in a final drying operation. The entire process may be carried out in a batch or continuous operation or combination thereof.

Variations in the above process, both as to materials and steps, are obvious and variations in the proportions of alumina to silica may be readily accomplished and are, of course, contemplated even in one aspect by mixing the gels either before or after washing and drying. Various methods of procedure whether by separate precipitation of the alumina and silica components and/or by co-precipitation may be employed to produce the sols and the gels.

I may present as further examples of the preparation of my additive the primary step of producing the additive hydrated silica and hydrated alumina; they may be separately precipitated and the precipitates mixed in the wet stage. Silica gels may be prepared by acidifying a solution of an alkali metal silicate. In the case of alumina the hydroxide may be precipitated by the use of alkaline materials or basic precipitants generally. Moreover, as a variant the precipitated silica gel may be added to an aqueous solution of aluminum salt and the hydrated alumina precipitation in the presence of the silica gel or the reverse process may be employed. These are merely cited as examples of the variations which may be employed.

The objective is to produce a final mixture of alumina and silica gels results in the proportions varying from 5% silica to 95% alumina and the reverse may be employed e.g., 95% silica gel to 5% alumina or 5% silica to 95% alumina. Also I may employ molecular ratios e.g. $Al_2O_3 \cdot 2SiO_2$ and the reverse $2Al_2O_3 \cdot SiO_2$ and each of the combinations may be hydrated with one (or less than one) or more molecules of water thus $Al_2O_3 \cdot 2SiO_2 \cdot 2H_2O$.

There are many theories about the structures of these gels including crystallographic arrangements, ionic distributions, acid sites and other factors which determine catalytic action. The effect of dehydration in calcining the mixture has also been studied extensively, and porosity and structure resulting from it have been observed, all of which are characteristic of the material having passed thru the hydrogel stage and probably from all work done to date containing some bound water after dehydration even at high temperatures. In any event the mixtures or combinations of alumina and silica, which I employ, are those which have been in a gel state and hydrated at various stages and in varying degrees during preparation and use, and which I shall refer to as hydrated or alternatively gell combinations of alumina and silica or both.

The dried gel combination of alumina and silica containing some bound water prepared as described or in an equivalent manner containing for example about 25% alumina and 75% silica may be added to kieselguhr employing about 90% of the latter in the mineral mix and the latter mixed with 100% equivalent phosphoric acid (employing e.g. 85% ortho phosphoric acid and $P_2O_5$ to make up to strength). The proportion of the 100% equivalent phosphoric acid is about 80% to about 20% of the mineral mix (the latter containing 10% of the alumina-silica and 90% of kieselguhr). The mixture is extruded (and if necessary heated slightly to obtain the right consistency for so doing) and reduced to proper size (⅛" to ¼" diameter and about ¼" length) and thereafter dried and baked for about 6 to 8 hours at 700° F. to 800° F. or above. The compression strength of the product ranges from 100 to 200 p.s.i. and much higher with the additive as compared to 15 to 30 p.s.i. with the standard that is without the additive. The loss in activity is very low; only several percent less than that shown by the standard phosphoric and kieselguhr catalyst without the additive; which is negligible in view of the greatly decreased cost resulting from the greatly increased life of the catalyst.

It is quite likely that the separate partially hydrated gels, that is the silica gel and the alumina gel, containing some bound water will react separately with the phosphoric acid in the above process and to the extent that benefits are obtained from each, I thereby claim their use separately as an additive as described for the mixture above on a non-equivalent basis to each other or to the mixture. However, the use of the mixed alumina-silica gel is greatly preferred in connection with the present invention.

From the above discussion, it will be observed that there is a great difference in composition of my catalyst compared with the prior art, and at the same time there is a wholly unexpected and marked improvement in the hardness and compression strength of the catalyst containing essentially only the kieselguhr and phosphoric acid while at the same time retaining the high activity of the latter composition. The catalysts of the present invention are different and greatly superior in all essential respects to those of the prior art, both from the viewpoint of composition as well as properties and utility.

The porous silica ($SiO_2$) material, kieselguhr, as well as (infusorial earth and diatomaceous earth) are also quite different from the additive both in chemical and physical characteristics and properties. The additive used here has some generic resemblance to kaolin in that it consists of hydrous alumina and silica. It lacks plasticity and the property of hardening and other physical characteristics which kaolin possesses. The latter (sometimes called china clay) is composed of silicon, oxygen and hydrogen corresponding to the general formula $Al_2O_3 \cdot 2SiO_2 \cdot 2H_2O$. It is derived from the weathering of feldspars. Kieselguhr (etc.) on the other hand is made up of the skeletal remains of diatoms and is essentially $SiO_2$. The several materials, including the additive and kaolin also differ in crystal structure and X-ray pattern among themselves. In fact, there are no similarities between either the present additive and kaolin on the one hand and kieselguhr on the other, and moreover a composition containing only one of these materials is entirely different in many respects from the others. In my copending applications I disclose the use of a number of materials in some cases chemically related, but in all cases non-equivalent to supply the deficiency in the kieselguhr-phosphoric type of polymerization catalysts in respect of hardness and compression strength and wearing qualities or catalyst life in general. However, it is to be emphasized that all of these additives are different from each other as well as from the alumina-silica combinations mentioned herein.

The terms kieselguhr, infusorial earth and diatomaceous earth (also tripolite) are used interchangeably, for example in Hackh's Chemical Dictionary (1929), and all three terms are defined as a light earthy sedimentary rock consisting of the microscopic empty shells of diatoms. Infusorial earth, kieselguhr, diatomite, tripolite, diatomaceous earth-siliceous earth are similarly used interchangeably and are referred to as—a fine powder composed of siliceous skeletons of diatoms, sp. gr. 0.24–0.34, in Chemical and Technical Dictionary (1947) and similarly in Chemical and Engineering Dictionary (both by Chemical Publishing Co.). The terms are likewise used interchangeable in Webster New Collegiate Dictionary (1951) based on Webster's New International Dictionary); Winston's Simplified Dictionary, College Edition, 1938; and Practical Standard Dictionary, Funk and Wagnall's (1929), also the Merck Index, 1952 edition, and others. These materials are likewise sold and used interchangeably under these several terms; the major portion of all of them being up to as high as 90% $SiO_2$ in the form of porous siliceous skeletal substances. Large deposits of these materials occur in various locations, e.g. California, Nevada, Oregon, etc. As with all naturally occurring materials, the $SiO_2$ content and impurities show variations within the general class as well as within the individual deposits. The terms kieselguhr, infusorial earth and diatomaceous earth and in general such naturally occurring porous siliceous materials will be used and referred interchangeably and on an equivalent basis in connection with the present invention. Tests on various such products showed comparable results within the variations which might be expected, i.e. the presence of other substances in varying amounts besides the porous siliceous materials in the several types. These with the higher amounts of porous silica are preferred.

The various well known phosphoric acids (ortho, pyro and meta) as well as those less well known phosphoric acids (such as tetra-phosphoric) all come within the scope of my invention. These phosphoric acids are related to each other in that they may be formed by successive dehydration steps and conversely they may be made from phosphorous pentoxide by successive additions of the proper amounts of water to $P_2O_5$. Also the latter may be added to various concentrations of phosphoric acid, e.g. from 75% to 85% and higher and the resultant mixture may be assumed (as has been done in the prior art "to contain free phosphorous pentoxide") that is to say that the latter has been added to the former. Alternatively the mixture may contain "a definite percentage of pyrophosphoric acid corresponding to the primary phase of dehydration of the orthophosphoric acid" or corresponding to the primary and secondary phases of hydration of the pentoxide. Meta phosphoric acid is also formed by the dehydration of ortho and pyrophosphoric acids or by the hydration of phosphorous pentoxide. Pyrophosphoric acid itself may be used at a temperature above its melting point of 140° F. but this is less desirable than the mixture. Therefore from the overall practical viewpoint and for convenience I prefer to use the orthophosphoric acid starting, for example, with the 85% commercial concentration (or diluting the latter as found desirable, e.g. from 75% to 85%) to which has been added various proportions of $P_2O_5$ (generally to a thick syrupy consistency); as found suitable or necessary simultaneously to incorporate the necessary amount of phosphoric acid in the mixture and to obtain a material of proper consistency prior to forming and baking. It is desirable to incorporate the maximum amounts possible of phosphoric acid which will produce a mixture which can be readily extruded and heated without flowing or undue deformation of the mixture during heating. Phosphorous pentoxide dissolves readily in orthophosphoric acid of commercial grade generally about 85% concentration particularly at elevated temperatures so that it is only a question of adjustment to obtain the desired concentration of the acid in the final product, e.g. about 80% or more by varying the concentration and amount of these two components, but of course, the other components must also be adjusted.

In order to ascertain readily the amounts of phosphoric acid present in the mixture especially for comparison I determine the percentages on the basis of 100% orthophosphoric acid irrespective of the concentration present during mixing and of the form in which it may be present in the final product after heating.

The heavy stiff paste or mixture made by mixing the various materials including the additives, i.e. the various alumina-silica compounds referred to above; the porous silica material, i.e. the kieselguhr etc. and the phosphoric acid may be formed into pellets or preferably by extrusion into suitable shapes and cut into proper sizes generally ⅛ to ¼″ diameter and about ¼″ length or otherwise formed, or the dried and baked material may be sized later.

The consistency of the mixture before drying may vary somewhat depending on the temperature of mixing, the relative proportions of the components including the specific additive, the kieselguhr and the relative amount and concentration of phosphoric acid. It is desirable in all cases that the proportions of the materials be adjusted so that the mixture is stiff enough to be formed by extrusion and dried or baked without flowing, or without too much deformation. The application of a relatively small amount of heat at low temperatures, e.g. about 150° F. to 200° F. after mixing assists in congealing and thickening the mixture if necessary to permit forming, although this step may generally be avoided by proper formulation of all the components; and even by adjustment of any one of the components after mixing, by adding one or the other as required.

The formed catalyst may be dried and/or baked at temperatures varying from about 600° F. (and at least 500° F.) to about 700° F. and higher for several hours and upwards for example 4 to 6 hours, except where the phosphoric acid content of the catalyst is above about 78% in which case I may heat to temperatures of from 700° F. to 800° F. and above using the higher temperatures following the first stage or for most of the entire heating period. Preferably the heating is done in two stages, i.e. to about 200° F. to 250° F. for one half to three quarters hour and then to about 600° F. to 700° F. and higher for about 4 to 5 hours or longer. The same time schedule, and longer, may be used for the higher temperatures. For some special cases, for example with very high acid contents of from 80% to 85%, I may employ temperatures progressively higher, for example from 800° F. to 900° F. (or higher as required) for 6 to 8 hours and longer but generally the lower ranges referred to above suffice. However, there is a definite correlation of the composition of my catalysts with temperatures and time of heating. The prior art polymerization catalysts generally require a greater period of prolonged heating at temperatures up to and above 900° F. In some cases in the very high temperature range, controlled dehydration of the baked catalysts may be desirable.

In my copending applications I disclose the use of kaolin, bentonite, montmorillonite, talc, and fuller's earth, among the silicates and various other additives, each of which shows improved results which, however, are characteristic, both in processing and in properties, of the specific additive. In my present invention I have found it desirable also to use mixtures of these with the silica-alumina additives, both from the view-point of economy as well as other benefits. The total amounts of the additives employed are comparable to those named herein.

To summarize, my invention produces a greatly superior product, and may therefore be used more economically. It corrects vital deficiencies in respect of wearing qualities such as hardness and compression strength in the prior art catalysts while at the same time retaining the high activity of the latter.

When used for polymerizing normally gaseous olefins, the granules or particles of catalyst are generally placed in treating towers and the gases containing olefins are passed downwardly through the towers at temperatures of 400° F. to 500° F. and pressures of several hundred pounds, e.g. 100 to 350 pounds per square inch when employing stabilizer refluxes which contain, e.g. 10 to 35% of propene and butenes. With gas mixtures containing normal and isobutene to obtain mixed polymerization the temperature may be lower, e.g. 250 to 350° F. with pressure of 500 to 800 pounds per square inch, other reactions may be similarly carried out. It may also be desirable to introduce some steam during the reaction to maintain the normal vapor pressure of the catalyst; or the gas may be saturated with water vapor.

To remove carbonaceous or hydrocarbonaceous materials which form and deposit during the treatment the catalysts are reactivated by superheated steam and/or air or oxygen at temperatures varying from 500° to 1000° F. dependent on the concentrations of oxygen. The steam concentration may be increased toward the end of the burning off period and then both steam and temperatures may be decreased towards the very end. All of these conditions are factors in maintaining the desirable balance between activity on the one hand and compression strength and hardness, and consequently the life of the catalyst, on the other hand.

The specific examples shown in the table following are typical of the proportions of materials used and the properties of the resulting products although they should not be construed as limiting either as to specific materials or proportions.

activity as expected was less than those shown. Such catalysts are however especially useful for alkylation reactions e.g. of benzene to cumene.

Tests were also made adding the silica-alumina additive to bentonite, talc, kaolin, and other additives disclosed in my copending applications with markedly beneficial results.

It is particularly noted in the table that good results are obtained when the additive is added direct to the phosphoric acid and this method may be preferred in some cases.

The table shows the formulation and composition, and in addition illustrates the characteristics of my improved polymerization catalysts with respect to comparative activity but more particularly with respect to structural or compression strength and hardness (resistance to abrasion) both of which are indexes of the wearing qualities and hardness. The structural or compressive strength tests represent the total thrust in pounds using the proving ring method on prepared representative specimens of fairly uniform size and shape (approximately ½" to ¾" cube) and represent the average of several comparative determinations on each type. The hardness data were made employing the Mohs' mineral scale which is conventional in determining the relative hardness of minerals. The hardness and compression strength of a standard containing 80% phosphoric acid and 20% kieselguhr (with no additive present) made under similar conditions, i.e. heating the mixture up to about 650° F. for 4 hours showed a hardness of about 1 on the same scale and compression strength of 10 to 15.

Heating the standard to between 700° F. and 800° F. and above for six hours (and even longer) increased these values (of the standard) for hardness to about 1+ and the compression strength to about 35. However, very much greater increases were shown when the samples from most of the runs, e.g. 5, 6 and 7 (shown in the table) were similarly treated showing greatly improved response of my product to such higher temperatures and longer periods of heating. On the other hand, for similar treatments at lower temperatures, and periods of treatment, my products are more responsive and therefore greatly superior, to the standard.

TABLE I

*Hydrated gel silica-alumina additive* [1]

|  | (1) |  | (2) |  | (3) |  | (4) |  | (5) |  | (6)[2] |  | (7) |  |
|---|---|---|---|---|---|---|---|---|---|---|---|---|---|---|
| Pts. by wt. of $H_3PO_4$ | 72.0 |  | 72.0 |  | 72.0 |  | 73.0 |  | 75.0 |  | 75.0 |  | 78.5 |  |
| Pts. by wt. of $P_2O_5$ | 40.0 |  | 40.0 |  | 40.0 |  | 40.0 |  | 42.0 |  | 42.0 |  | 44.0 |  |
| Equiv. of 100% $H_3PO_4$ | 116.6 |  | 116.6 |  | 116.6 |  | 117.3 |  | 122.0 |  | 122.0 |  | 127.7 |  |
| Percent of 100% $H_3PO_4$ |  | 78.0 |  | 79.0 |  | 79.5 |  | 79.5 |  | 79.0 |  | 80.0 |  | 80.5 |
| Pts. by wt. of kieselguhr | 30.0 |  | 29.0 |  | 29.0 |  | 29.0 |  | 30.0 |  | 29.0 |  | 29.0 |  |
| Percent by wt. of kieselguhr |  | 20.2 |  | 19.8 |  | 19.8 |  | 19.6 |  | 19.5 |  | 19.0 |  | 18.3 |
| Pts. by wt. of additive | 3.0 |  | 2.0 |  | 1.5 |  | 1.8 |  | 2.5 |  | 2.0 |  | 2.0 |  |
| Percent of additive [3] |  | 2.0 |  | 1.4 |  | 1.0 |  | 1.2 |  | 1.6 |  | 1.3 |  | 1.3 |
|  |  | 100.2 |  | 100.2 |  | 100.3 |  | 100.3 |  | 100.1 |  | 100.3 |  | 100.1 |
| Relative hardness | 2.0 |  | 2.0 |  | 1.5 |  | 2.0 |  | 2.5 |  | 2.5 |  | 2.5 |  |
| Relative compression strength | 200 |  | 175 |  | 160 |  | 200 |  | 275 |  | 250 |  | 250 |  |

[1] Proportions of the gels in the additive varying from 35% to 50% of each were found to give substantially similar results.
[2] No. 6 was repeated adding the additive direct to the mixture of phosphoric acid and $P_2O_5$ with hardness and compression strength of the product being equal to or superior to those shown in #5, that is 3.5 and 300, respectively.
[3] The percentage of additive based on the mineral mix in the above examples varied from 5% to 10%.

NOTE.—Preliminary heating of all products to 250° F. for about 1 hour; Nos. 1 and 2 were subsequently heated to 600° F. to 750° F. for about 6 hours; Nos. 3 and 4 were heated in the range of 700° F. to 850° F. for about 6 hours; and Nos. 5, 6 and 7 were heated in the range between 800° F. to 900° F. for about 8 hours.

ADDITIONAL EXAMPLES

Various tests were made employing higher proportions of kieselguhr as well as of the additive with lesser amounts of phosphoric acid and marked improvement in crushing strength and hardness were obtained, but the In general, increases in the amount of the silica-alumina additive for example up to about 3% of the total mix, and the temperature to 850° F. and above, with periods of heating of 8 hours and above, increased the compression strength and hardness correspondingly.

With regard to polymerization activity the conventional method for the polymerization of propylene under controlled and comparable experimental conditions may be employed. The catalysts shown in the table vary within several percent only (and generally not more than about 5%) from the standard that is about 97% to 101.0% dependent upon initial amounts of phosphoric acid and additives as compared to 100% for the standard depending on the percentage of the additive; being in the lower range with the maximum additive and minimum phosphoric acid content shown in the table and highest with the minimum additive (which produces the desired improvement in compression strength and hardness) and maximum phosphoric acid content. The latter, of course, determines the activity. These values are consistent with reported data on a standard polymerization catalyst containing about 80% phosphoric acid and 20% kieselguhr. The generally assigned activity of the latter may vary dependent on conditions of the test but is reported about 80, on an absolute basis which may be considered as 100 on the comparative scale. Additional phosphoric acid in the catalyst incorporated in the mixture may exceed the standard, although small differences in activity may be negligible from a practical viewpoint considering the greatly increased value as a result of greatly increased hardness and compression strength and from the economic and practical viewpoint of the greatly prolonged life of the catalysts produced according to my invention. The aim, therefore, should be to obtain an economic balance between catalyst activity and life.

The general procedure for producing catalysts with activities higher than the standard is to increase the phosphoric acid contents by increasing both the $H_3PO_4$ and $P_2O_5$. The latter may be varied considerably as it readily dissolves in the 85% phosphoric acid on warming. The heavy liquid resulting from increased $P_2O_5$ permits a somewhat reduced proportion of kieselguhr or increased proportion of total phosphoric acid while at the same time maintaining proper workability of the mixture. For the higher phosphoric acid contents the additive should be between about 5% and 10% of the mineral mixture (kieselguhr and additive) or between 1% and 2% of the total; and the heating temperature and time of heating should be increased as shown above, i.e. correlated with the phosphoric acid content.

It is, of course, necessary in these special cases to maintain a proper and fairly close balance in the relative amounts of the various components including the phosphoric acid, the phosphorous pentoxide, the silica-alumina additive and kieselguhr in order to obtain an initial mixture that is workable, i.e. may be readily extruded and at the same time does not flow or deform on heating and which at the same time will produce the desired hardness and compression strength while maintaining the activity of the final product. In carrying out these formulations the sequence of mixing may be a factor as previously observed.

At the other end of the scale, I may when desired, increase the kieselguhr content of the catalyst or the additive or both and reduce the phosphoric acid content, e.g. from 60 to 75% (or more) to make a catalyst of lower activity but otherwise of very high compression strength and hardness. The lower range of the special type represents a type which might be used only in very special cases, but the upper range, e.g. from 56% to 75% $H_3PO_4$ might find considerable use, e.g. in alkylation. However, the ranges above this e.g. 75 to 80% and especially between 78% and 82% $H_3PO_4$ (with corrections for additive) are preferred as these would be most widely employed as starting activities for normal operations of polymerizing olefin gases to produce high octane motor fuels.

It is also to be emphasized that, while not the most desirable procedure, adjustments in proportions of the components may be made after the initial mixture is made to develop certain properties especially variability and the desirable balance between activity and compression strength.

It will be understood that there are many variations in initial concentrations of phosphoric acid, the percentages and amounts of phosphorous pentoxide which may be incorporated therein as well as the quality and proportions of kieselguhr and of the relative proportions of silica and alumina and amount of the additive required to give a mixture of the proper consistency to allow extrusion and to be heated without deformation or flowing of the material being heated; and at the same time to produce the requisite properties of activity, hardness and compression strength.

It is to be further understood, as indicated above, that some reaction may occur between the additives employed herein and the phosphoric acid, and therefore by the term additive as used in the claims I include the additives as such and/or their reaction products in terms of the amounts or percentages of additives used and referred to as such.

I claim:

1. A polymerization catalyst comprising a dried mixture of phosphoric acid and an inorganic support, said support consisting essentially of a natural porous silica material selected from a group consisting of kieselguhr, infusorial earth and diatomaceous earth and an additive formed from combinations of hydrated silica and alumina gels, each being present in the additive mixture in quantity in the range of 5 to 95%, the said phosphoric acid comprising about 70% to 85% of the said mixture, said support containing not less than about 80% of the said porous silica material and less than about 20% and more than 1% of said additive, said support being further characterized in that the said porous silica material together with said additive comprises not more than about 30% of the mixture.

2. A polymerization catalyst comprising a dried mixture of phosphoric acid and an inorganic support, said support consisting essentially of a natural porous silica material selected from the group consisting of kieselguhr, infusorial earth and diatomaceous earth and an additive formed from combinations of hydrated silica and alumina gels, each being present in the additive mixture in quantity in the range of 5 to 95%, the said phosphoric acid comprising about 75% to 85% of the said mixture, said support containing in the range of about 85% to 97% of the said porous silica material and in the range of 3% to 15% of said additive, said support being further characterized in that the said porous silica material together with said additive comprises less than about 25% of the mixture.

3. A polymerization catalyst comprising a dried mixture of phosphoric acid and a mineral support, said support consisting essentially of a material selected from the class consisting of kieselguhr, infusorial earth and diatomaceous earth and an additive formed from combinations of hydrated silica and alumina gels, each being present in the additive mixture in quantity in the range of 5 to 95%, the said phosphoric acid comprising about 75% to 85% of the said mixture, said support containing not less than about 80% of the said material selected from the class consisting of kieselguhr, infusorial earth and diatomaceous earth and less than about 20% and more than 3% of said additive, said support being further characterized in that the said material selected from the class consisting of kieselguhr, infusorial earth and diatomaceous earth together with said additive comprises not more than about 25% of the mixture.

4. A catalyst of the type described in claim 1 wherein the percentage of additive in the total mixture is correlated with the percentage of the phosphoric acid whereby the latter falls within the range of about 78% to 82% and the said additive is present within the range of about one-half percent to about four percent of the catalyst.

5. An improved polymerization catalyst comprising as defined in claim 1 a dried mixture of phosphoric acid and an inorganic support, said support consisting essentially of a porous natural silica material selected from the group consisting of kieselguhr, infusorial earth and diatomaceous earth and an additive, the said additive being formed from combinations of hydrated silica and alumina gels, each being present in the additive mixture in quantity in the range of 5 to 95%, and being present in an amount of more than 2% and less than about 20% of the said inorganic support.

6. An improvement in the process for producing a catalyst comprising a dried mixture of phosphoric acid and an inorganic support, said support consisting essentially of a natural porous silica material selected from the group consisting of kieselguhr, infusorial earth and diatomaceous earth and an additive formed from combinations of hydrated silica and alumina gels, each being present in the mixture in quantity in the range of about 5 to 95%, the said phosphoric acid comprising about 70% to 85% of the said mixture, said support containing not less than about 80% of the said porous silica material and less than about 20% and more than 1% of said additive, said support being further characterized in that the said porous silica material together with said additive comprises not more than about 30% of the mixture in which the said materials are admixed and dried at on elevated temperature and wherein the temperature of drying is correlated with the percentage of phosphoric acid in the mixture so that as the latter is increased from 75% to 85% the temperature of drying is raised corresponding from not less than about 600° F. to 900° F. and above for a period of at least several hours.

7. An improvement in the process for producing a catalyst comprising a dried mixture of phosphoric acid and an inorganic support, said support consisting essentially of a natural silica material selected from the group consisting of kieselguhr, infusorial earth and diatomaceous earth and an additive formed from combinations of hydrated silica and alumina gels, each being present in the mixture in quantity in the range of about 5 to 95%, the said phosphoric acid comprising about 70% to 85% of the said mixture, said support containing not less than about 80% of the said porous silica material and less than about 20% and more than 1% of said additive, said support being further characterized in that the said porous silica material together with said additive comprises not more than about 30% of the mixture in which the said additive is added directly to the said phosphoric acid and the resulting reaction mixture thereafter admixed with the said porous silica and dried at an elevated temperature in excess of about 500° F. for a period of at least several hours.

8. An improved polymerization catalyst as defined in claim 1 comprising a dried mixture of phosphoric acid and an inorganic support, said support consisting essentially of a porous natural silica material selected from the group consisting of kieselguhr, infusorial earth and diatomaceous earth and an additive formed from combinations of hydrated silica and alumina gels, each being present in the additive mixture in quantity in the range of 5 to 95%, reacted with a phosphoric acid, said reaction product being present in an amount of about 3% to 20% of the said inorganic support and less than about 10% of the total mixture.

9. An improved polymerization catalyst comprising a dried mixture of phosphoric acid and an inorganic support, said support consisting essentially of a porous natural silica material selected from the group consisting of kieselguhr, infusorial earth and diatomaceous earth and of an additive formed from combinations of hydrated silica and alumina gels, each being present in the additive mixture in quantity in the range of 5 to 95%, the said additive being present in an amount of about 3% to 20% of the said inorganic support and less than about 10% of the total mixture, the said phosphoric acid comprising about 75% to about 85% of the total mixture and the remaining component of the said catalyst consisting essentially of said porous natural silica material.

References Cited by the Examiner
UNITED STATES PATENTS

| 2,018,065 | 10/35 | Ipatieff | 252—435 |
| 2,120,702 | 6/38 | Ipatieff et al. | 252—435 |
| 2,275,182 | 3/42 | Ipatieff et al. | 252—435 |
| 2,713,560 | 7/55 | Morrell | 252—435 |
| 3,044,964 | 7/62 | Morrell | 252—435 |
| 3,050,472 | 8/62 | Morrell | 252—435 |

MAURICE A. BRINDISI, *Primary Examiner.*